Patented Mar. 3, 1942

2,275,211

UNITED STATES PATENT OFFICE 2,275,211

PROCESS FOR LIQUID PURIFICATION

Oliver M. Urbain and William R. Stemen, Columbus, Ohio, assignors to Charles H. Lewis, Harpster, Ohio No Drawing. Application January 17, 1938, Serial No. 185,471

5 Claims. (Cl. 210—24)

This invention relates to water softening and liquid purification. More specifically, it relates to the removal of cations from liquids by a process of cation or base exchange.

Processes of water softening and cation removal have been known for a number of years. Perhaps the most commonly used materials are the zeolites, or alumino-silicates, although many other compounds having base exchange properties have been prepared. Such compounds, however, are not satisfactory for use in waters of high acidity since they tend to break down and lose their physical structure when brought into contact with acids.

To overcome these difficulties in the softening of waters of high acidity, efforts have recently been made to employ hydrogen permutites or carbonaceous materials having exchangeable hydrogen ions. Although such materials do effect water softening and cation removal in acid solutions, their capacity for cation exchange is very limited, thus making it necessary to employ large quantities of such materials and resulting in excessive costs for softening of waters of high hydrogen ion concentration.

Considerable difficulty has also been experienced in the regeneration of those hydrogen permutite exchange materials now employed to effect cation exchange in acid mediums. Such materials appear to be effective only in their original form, wherein they possess hydrogen ions, and often have little or no cation exchange capacity after attempted regeneration.

It is an object of this invention to provide processes for water softening and liquid purification employing materials which will function satisfactorily in acid mediums. It is a further object to provide materials for base exchange having a high capacity for cations. Additionally, it is an object of this invention to provide a process for cation exchange which will permit the regeneration of the materials employed without appreciable loss. Other objects will be apparent to those skilled in the art from the following description of the processes and materials employed.

The materials employed in the processes of this invention are the basic salts of polybasic organic acids with metals having amphoteric properties. These materials are prepared by the reaction between polybasic organic acids and metals having amphoteric properties, or their salts, such reaction yielding the basic salts having cation exchange properties. These salts may, if desired, be converted into other salts possessing similar properties by a process of cation exchange, and all such salts are to be understood as included by the term "basic salts of polybasic organic acids and amphoteric metals" as used throughout the specification and claims.

The polybasic organic acids employed for the preparation of the preferred exchange compounds are those acids containing two or more theoretical acid hydrogen atoms per molecule. Exemplary of such acids are the following:

Mellitic acid _____ $C_6(COOH)_6$
Mellophanic acid _____ $1\text{-}2\text{-}3\text{-}4\text{-}C_6H_2(COOH)_4$
Prehnitic acid _____ $1\text{-}2\text{-}3\text{-}5\text{-}C_6H_2(COOH)_4$
Tetrachlorophthalic acid_ $C_6Cl_4(COOH)_2$
Naphthalenetetrasulfonic
  acid _____ $C_{10}H_4(SO_3H)_4$ The metals employed in the preparation of the exchange compounds are those having amphoteric properties such as:

Aluminum
Tin
Zinc
Lead
Chromium
Zirconium
Titanium

A general equation for the formation of basic salts of polybasic organic acids and amphoteric metals may be expressed as follows:

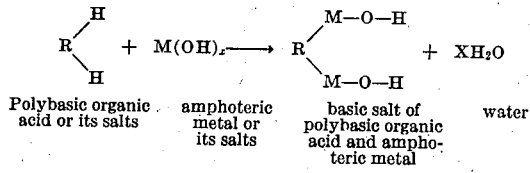

Polybasic organic   amphoteric   basic salt of        water
acid or its salts   metal or     polybasic organic
                    its salts    acid and ampho-
                                 teric metal The foregoing equation represents the formation of a desired basic salt of polybasic organic acids and amphoteric metals

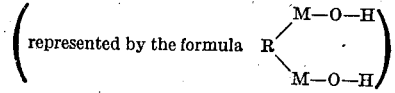

through the reaction of a polybasic organic acid with an amphoteric metal. It will be observed that the resulting salt is basic since it possesses replaceable cations attached to the organic molecules through the amphoteric metal and oxygen. The acidic hydrogen of the polybasic organic acid has combined with one or more, but not with all, of the anion groups of the amphoteric metal compound. The remaining anion groups of the amphoteric metal compound provide the replaceable cation which is utilized according to this invention to effect cation exchange.

Exemplary of one reaction which may be effected to produce the cation exchange materials of this invention is the following equation showing the reaction between mellitic acid and aluminum hydroxide:

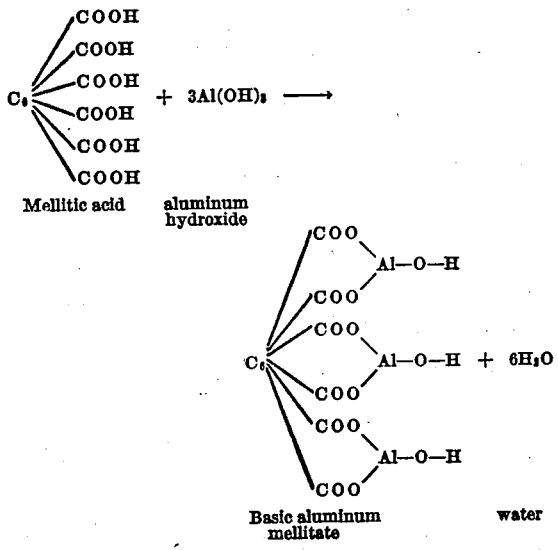

The preparation of the sodium salt of stannic prehnitate through the reaction of sodium prehnitate with stannic chloride is represented by the following equation:

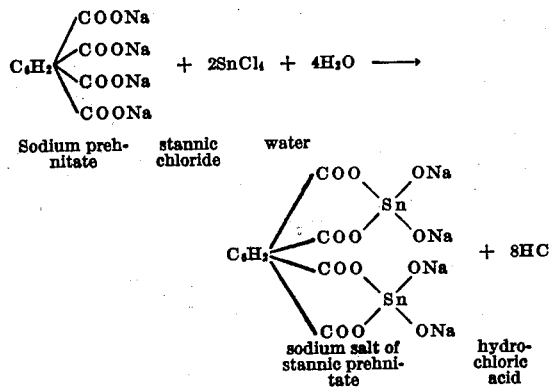

These and other materials obtained by methods similar to those represented by these equations were found to possess a high capacity for base exchange, were quite stable in acid solution, and could be quickly and satisfactorily regenerated without appreciable loss.

The exchange materials containing replaceable hydrogen may be converted into their salts by treatment with solutions containing cations which will replace the hydrogen ions. For example, the sodium salt of basic aluminum mellitate may be prepared by treating the material obtained in the first of the above equations with a concentrated solution of sodium chloride. The equation for the preparation of such a salt reads as follows:

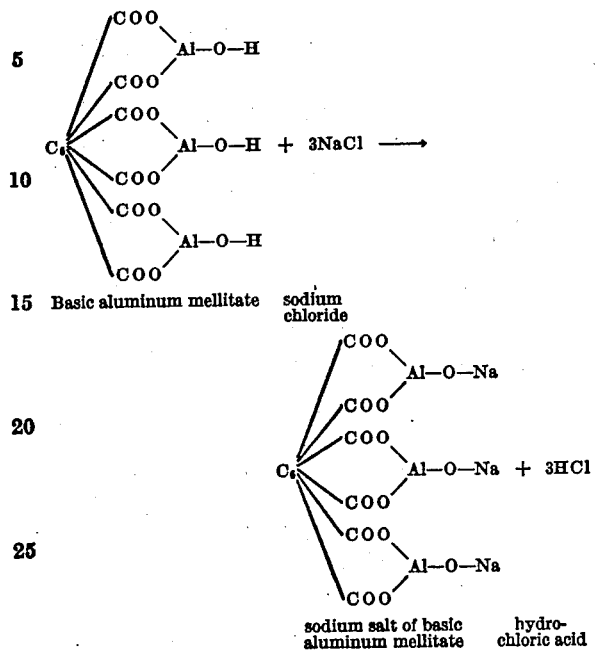

It will thus be observed that the materials employed in this process conform in general to the following structural formula or modifications thereof:

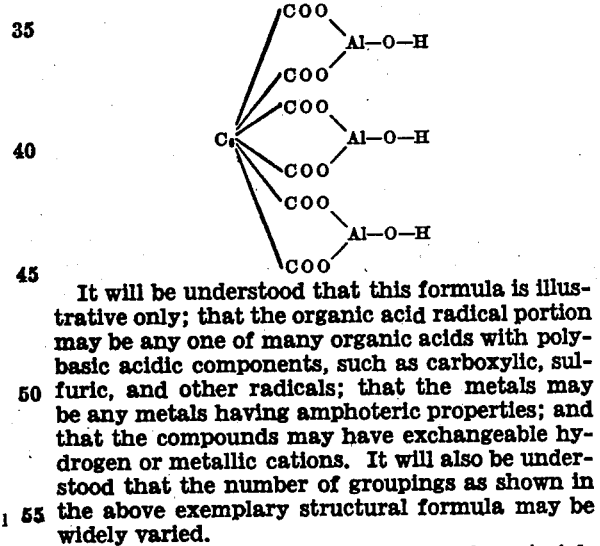

It will be understood that this formula is illustrative only; that the organic acid radical portion may be any one of many organic acids with polybasic acidic components, such as carboxylic, sulfuric, and other radicals; that the metals may be any metals having amphoteric properties; and that the compounds may have exchangeable hydrogen or metallic cations. It will also be understood that the number of groupings as shown in the above exemplary structural formula may be widely varied.

The essential characteristics of such materials are (1) their formation through the reaction of polybasic organic acids or their salts on metals having amphoteric properties, or their salts, and (2) their available replaceable cation, either constitutive or sorbed, resulting from the incomplete reaction of some, but not all, of the amphoteric anion groups with the cations of the organic acids or salts. This latter characteristic is specifically recited in the claims by the use of the term "basic" in referring to the exchange salts. The reaction products are solid materials having a solubility of less than 0.03 gram per 100 cc. of water at 20° C.

The base exchange materials thus prepared are employed in water softening or liquid purification in conventional methods. They may be utilized in contact filters and adapted to use in the filter bed type of water softening apparatus. Or such materials may be added directly to the liquid with agitation, after which the converted exchange compounds are separated and removed from the softened water or purified liquids.

Reactions of the basic salts of polybasic organic acids and amphoteric metals with hardness forming cations of water or with other cations which one may be desirous of removing from a solution are given in the following equations. For purposes of illustration, the exchange material is shown as containing only a few active groups, but it should be understood that such materials may contain a plurality of such active groups.

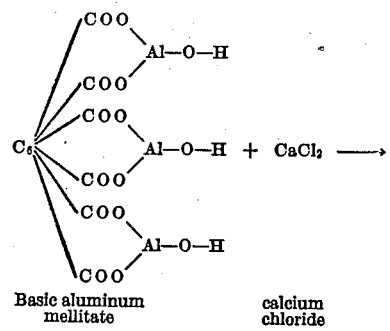

Basic aluminum mellitate    calcium chloride

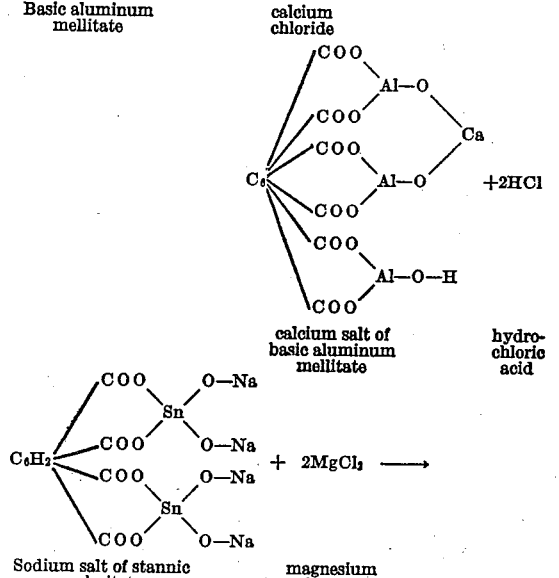

calcium salt of basic aluminum mellitate    hydrochloric acid

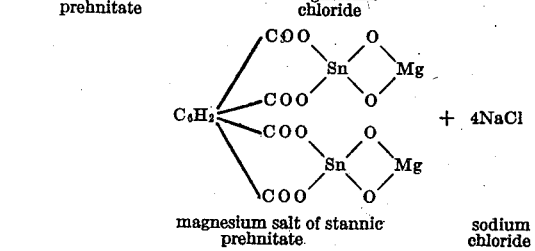

Sodium salt of stannic prehnitate    magnesium chloride magnesium salt of stannic prehnitate    sodium chloride After the exchange materials have become exhausted, they may be regenerated by treating with solutions of acids, salts, or bases. A preferred process of regeneration involves the treating of the exhausted exchange materials with solutions containing from 2% to 8% of mineral acids. The regenerating solutions may be flowed through the exchange material in the conventional regeneration process, or the exhausted exchange material may be treated with the regenerating liquid in vats or containers.

The regeneration of a basic salt of a polybasic organic acid and an amphoteric metal which has been used to remove calcium ions from water may be illustrated by the following equation:

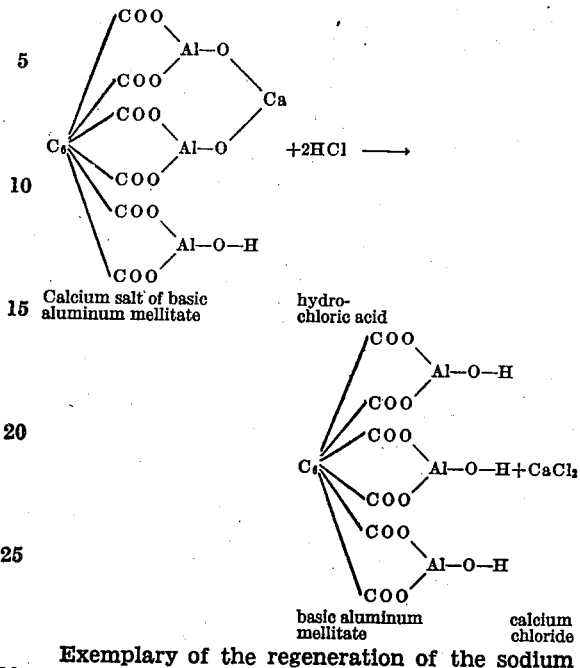

Calcium salt of basic aluminum mellitate    hydrochloric acid basic aluminum mellitate    calcium chloride Exemplary of the regeneration of the sodium salt of stannic prehnitate after it has become exhausted in the removal of magnesium cations from water, through the use of an acid, there is given the following equation:

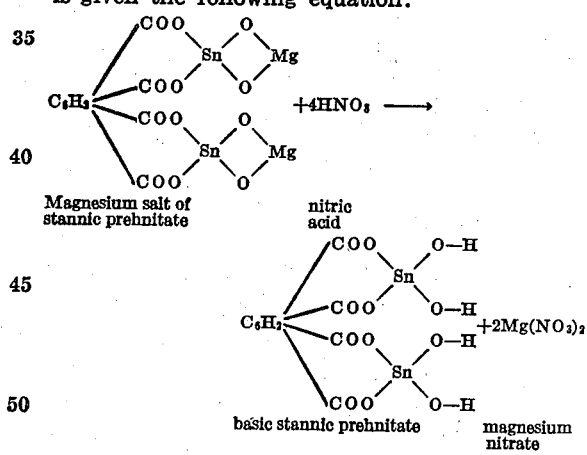

Magnesium salt of stannic prehnitate    nitric acid basic stannic prehnitate    magnesium nitrate Or an exhausted basic stannic prehnitate exchange material may be regenerated through treatment with an alkali in accordance with the following equation:

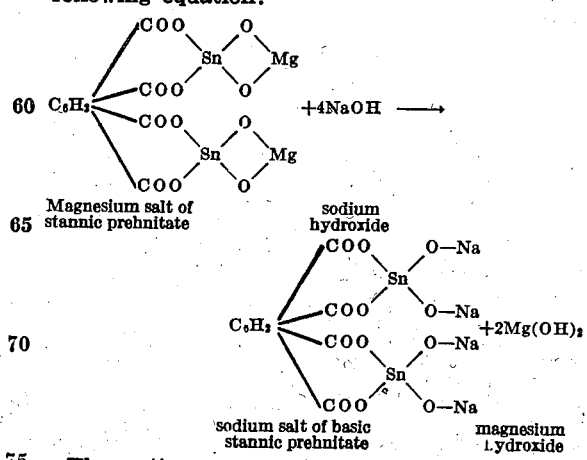

Magnesium salt of stannic prehnitate    sodium hydroxide sodium salt of basic stannic prehnitate    magnesium hydroxide The cations removed from the liquid being treated will, of course, be found in the regenerating solutions, and, if recovery is desired, they can be removed by conventional methods such as fractional distillation or fractional crystallization.

It is to be expressly understood that the foregoing description and examples are merely illustrative and are not to be considered as limiting this invention beyond the scope of the subjoined claims.

Having thus described our invention, we claim:

1. A process of liquid purification which comprises exchanging cations by contacting the liquid with a solid, water insoluble basic salt of a polybasic organic acid and an amphoteric metal, said salt having cation exchanging properties.

2. A process of water purification which comprises removing hardness-forming cations by contacting the water with a solid, water insoluble basic salt of a polybasic organic acid and an amphoteric metal, said salt having cation exchanging properties.

3. A process for exchanging cations in water which comprises contacting the water with a solid, water insoluble basic salt of a polybasic organic acid and an amphoteric metal characterized in that it is stable in water and possesses high exchange capacity.

4. A process for exchanging cations in liquids which comprises the steps of adding a cation exchange material comprising a solid, water insoluble basic salt of a polybasic organic acid and an amphoteric metal to the liquid, agitating for a short period, and effecting removal of the converted exchange material.

5. A process for exchanging cations in liquids which comprises the step of passing the liquid through a filter charged with a cation exchange material comprising a solid, water insoluble basic salt of a polybasic organic acid and an amphoteric metal.

OLIVER M. URBAIN.
WILLIAM R. STEMEN.